United States Patent [19]

Thompson et al.

[11] Patent Number: 4,739,899

[45] Date of Patent: Apr. 26, 1988

[54] O-RING CLOSURE ASSEMBLY

[75] Inventors: Robert W. Thompson; Angelo V. Pugliese, Jr., both of San Diego, Calif.

[73] Assignee: UOP Inc., Des Plaines, Ill.

[21] Appl. No.: 916,756

[22] Filed: Oct. 8, 1986

[51] Int. Cl.$^4$ ............................................. B65D 53/00
[52] U.S. Cl. .................................... 220/240; 220/378; 220/319; 220/3
[58] Field of Search ................. 220/378, 319, 3, 240; 277/168, 188

[56] References Cited

U.S. PATENT DOCUMENTS

| | | | |
|---|---|---|---|
| 2,790,462 | 4/1957 | Ashton | 220/319 |
| 2,873,878 | 2/1959 | Wolf et al. | 220/378 |
| 3,310,283 | 3/1967 | Carlton | 251/357 |
| 3,966,616 | 6/1976 | Bray | 210/433 |
| 4,203,607 | 5/1980 | Brieger | 277/188 |
| 4,252,332 | 2/1981 | Nakayama et al. | 277/168 |
| 4,444,331 | 4/1984 | Lankston | 220/304 |
| 4,594,161 | 6/1986 | Goto | 210/433.2 |
| 4,600,512 | 7/1986 | Aid | 210/433.2 |

Primary Examiner—George T. Hall
Attorney, Agent, or Firm—Thomas K. McBride; John F. Spears, Jr.; John G. Cutts, Jr.

[57] ABSTRACT

A closure assembly for pressure vessels comprising a hollow pressure vessel having an internal cylindrical surface, a cylindrical end plug slidably mounted in the pressure vessel and contacting the internal cylindrical surface, the internal cylindrical surface having a first continuous circular groove to receive a segmented ring which retains the cylindrical end plug in the pressure vessel, and the cylindrical end plug having a second continuous circular groove to receive an O-ring seal, the second continuous circular groove having a ramped bottom and two substantially vertical side walls.

26 Claims, 1 Drawing Sheet

O-RING CLOSURE ASSEMBLY

BACKGROUND OF THE INVENTION

The field of art to which the present invention relates is an O-ring closure assembly for a pressure vessel. In particular, the present invention pertains to an O-ring closure assembly employed to plug and seal an open end of a pressure vessel and which closure possesses the ability to be closed and subsequently opened without excessive effort.

INFORMATION DISCLOSURE

Various types of closure devices are employed in industry to effect the closure of an open end of a pressure vessel. A common and well-known closure device incorporates the use of an O-ring to seal the joint beteen surfaces of the structural parts which seal an open end of a vessel to thereby prevent the passage or flow of fluid from the interior of the vessel or chamber to the outside.

In U.S. Pat. No. 3,310,283 (Carlton), a pressure seal groove to be used with an O-ring is disclosed. The groove has a depth less than the diameter of the O-ring, undercut symmetrical side walls having the upper portion cut on the same curvature and center as the O-ring and the remainder cut on a larger arc with a lower center than the O-ring center leaving a transverse peak at the intersection of the curves, and a groove opening of a width less than the diameter of the O-ring.

In U.S. Pat. No. 4,203,607 (Brieger), a conventional O-ring groove which is extended but has no ramp feature is disclosed. The extended groove contains an annular sealing element (O-ring) and a supplemental sealing element comprised of a semi-fluid bridging material containing particulate matter.

In U.S. Pat. No. 4,252,332 (Nakayama et al.), a conventional O-ring groove having a narrow annular clearance space to provide limited access to the O-ring is disclosed. However, no ramp feature is disclosed or taught in the '607 patent.

In U.S. Pat. No. 4,444,331 (Lankston), a conventional O-ring groove having a narrow annular clearance space to allow the dilation of the member containing the O-ring groove is disclosed. The '331 patent does not teach or disclose a ramp feature incorporated into the O-ring groove.

In U.S. Pat. No. 3,996,616 (Bray), a reverse osmosis or ultrafiltration membrane cartridge having the inner end and side areas of a permeate transfer leaf sealingly attached to its central collection tube surface with O-rings seated in the collector tube grooves is disclosed.

In U.S. Pat. No. 4,594,161 (Goto), a reverse osmosis sealing means is disclosed.

In U.S. Pat. No. 4,600,512 (Aid), a reverse osmosis water purification module having various seals is disclosed.

All previously known O-ring closure devices utilize an O-ring which is housed in a groove whose dimensions are dictated by the size of the O-ring. During the installation and use to these known devices, the O-ring must be compressed to effect a seal. Although such designs are simple, easy to manufacture and relatively easy to maintain in adverse conditions, they possess significant drawbacks or shortcomings. Usually end plug closures are manually installed in an opening of a pressure vessel which requires some strength and technique and the O-ring is compressed as the plug is inserted into the opening. Such insertion is difficult to perform, but with proper lubrication it is achievable by hand for an end plug up to about 8 inches in diameter. The installation is, however, not as difficult as the removal of the end plug after a long period of time in service or operation. During the time of operation, the O-ring becomes flattened due to the compression necessary to effect the seal. This set or flattening causes the O-ring to stick to the pressure vessel and requires a very large force to overcome the friction. Proper lubrication for removal is difficult, if not impossible, to achieve and the accumulation of dirt, foreign matter, or corrosion products around the general area of the O-ring seal also increases the friction, as well as removal effort. The pulling force necessary to recompress the O-ring after it has been pulled into the retaining ring groove and remove the end plug is difficult to apply in many applications due to the lack of grip points on the end plug.

We have discovered an improved O-ring closure assembly wherein the O-ring groove has been modified to overcome the disadvantages of the known closure assemblies.

BRIEF SUMMARY OF THE INVENTION

The invention provides a novel O-ring closure assembly to be employed to plug and seal an open end of a pressure vessel. The closure assembly includes an end plug having a groove or taper with a ramped bottom to retain an O-ring seal. After the end plug is installed together with an O-ring seal and the pressure increases, the O-ring will roll up the ramped bottom and come to rest in a smaller part of the groove or taper causing the O-ring to provide a seal between the end plug and the wall of the pressure vessel. The removal of the end plug is greatly facilitated by the ability of the O-ring to roll back down the ramp to reduce the friction between the end plug and the pressure vessel.

One embodiment of the invention may be characterized as a closure assembly for pressurized vessels comprising a hollow pressure vessel having an internal cylindrical surface, a cylindrical end plug slidably mounted in the pressure vessel and contacting the internal cylindrical surface, the internal cylindrical surface having a first continuous circular groove to receive a segmented ring which retains the cylindrical end plug in the pressure vessel, and the cylindrical end plug having a second continuous circular groove having a ramped bottom and two substantially vertical side walls.

Another embodiment of the invention may be characterized as an apparatus for receiving and retaining an O-ring seal located in the surface of a cylindrical member to be in sliding sealing engagement with an exposed member wherein said apparatus comprises a groove having a ramped bottom and two substantially vertical side walls with said groove extending around said surface of said cylindrical member.

Another embodiment of the invention may be characterized as a cylindrical end plug having a continuous circular groove having a ramped bottom and two substantially vertical side walls for receiving and retaining an O-ring seal.

Another embodiment of the invention may be characterized as a cylindrical end plug having a continuous circular taper adjacent to an annular projection for receiving and retaining an O-ring seal.

Yet another embodiment of the invention may be characterized as a process for conducting reverse osmosis in a pressure vessel having a closure assembly which comprises a hollow pressure vessel having an internal cylindrical surface, a cylindrical end plug slidably mounted in the pressure vessel and contacting the internal cylindrical surface, the internal cylindrical surface having a first continuous circular groove to receive a segmented ring which retains the cylindrical end plug in the pressure vessel, the cylindrical end plug having a second continuous circular groove to receive an O-ring seal, the second continuous circular groove having a ramped bottom and two substantially vertical side walls.

Other embodiments of the present invention encompass further details such as preferred mechanical components and design details, all of which are hereinafter disclosed in the following discussion of each of these facets of the invention.

BRIEF DESCRIPTION OF THE DRAWING

The drawing is presented in illustration of at least one preferred embodiment of the invention and is not intended as an undue limitation of the generally broad scope of the invention as set out in the appended claims.

DETAILED DESCRIPTION OF THE INVENTION

In accordance with the present invention, an improved O-ring closure assembly has been found wherein the O-ring groove has been modified to overcome the disadvantages of the known closure assemblies. This modification allows the O-ring assembly to be installed while the O-ring resides in the smaller diameter of the improved O-ring groove which is designed so that the smaller diameter permits the O-ring to clear the pressure vessel wall and therefore the end plug can be positioned in the pressure vessel opening without fully compressing the O-ring, thus minimizing the force required during installation. With the end closure assembly of the present invention in place and when the vessel is pressurized, the O-ring will roll up the ramp in response to the pressure and come to rest in a larger diameter of the improved O-ring groove which will then seal the pressure vessel. This closure assembly of the present invention has an additional advantage of allowing the O-ring to reverse its position by rolling down the ramp to the smaller diameter of the improved O-ring groove when the end plug is removed, thus permitting the installer to accomplish the installation and removal of the end plug with very little effort. Other uses for the present invention include, for example, sealing pressure vessels, tanks, filters, pumps, valves, rotating equipment and pressurized petroleum refining equipment.

Figure 1:
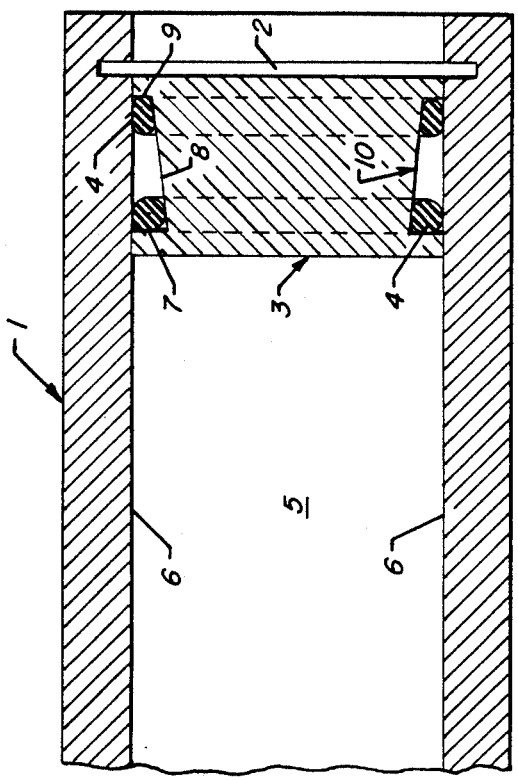
FIG. 1 of the drawing represents a longitudinal cross-sectional view of a closure assembly.

The details of the closure assembly of the present invention may be discerned by reference to the drawing. Referring to FIG. 1, there is shown pressure vessel 1 having pressure vessel wall 6 and pressure vessel interior 5. At one end of pressure vessel 1 on the interior of pressure vessel wall 6 is provided an annular segmented ring groove 2. A cylindrical end plug 3 is provided to be slidably mounted in the open bore defined by pressure vessel wall 6 to serve as a closure which end plug is retained in pressure vessel 1 by means of a segmented ring (not shown) installed in segmented ring groove 2. End plug 3 is provided with annular ramped O-ring groove 10 for receiving and retaining O-ring 4. O-ring groove 10 includes vertical O-ring side wall 7 and 9, and O-ring groove bottom 8. O-ring groove side wall 7 possesses a dimension or depth which is greater than the dimension or depth of O-ring groove side wall 9. O-ring groove bottom 8 is ramped or sloped surface which enables the installation and removal of end plug 3 to be performed with improved ease.

Figure 2:
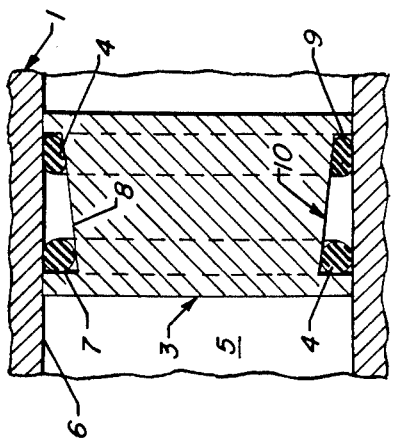
FIG. 2 of the drawing represents a cross-sectional view of a preferred end plug.

In FIG. 2 an enlarged cross-sectional view of a preferred end plug 3 is shown and which is provided with annular ramped O-ring groove 10 for receiving and retaining O-ring 4. O-ring groove 10 includes vertical O-ring groove side wall 7 and 9, and sloped O-ring groove bottom 8. O-ring groove side wall 7 is the first portion of O-ring groove 10 to be inserted and installed in the opening of a pressure vessel and possesses a dimension or depth which is greater than the dimension or depth of O-ring groove side wall 9. It is preferred that the dimension of O-ring groove side wall 7 is equal to or greater than the diameter of O-ring 4 in its transverse cross-section which provides a position or location for O-ring 4 to reside during installation. It is also preferred that the dimension of O-ring groove side wall 9 is equal to or less than the diameter of O-ring 4 in its transverse cross-section so that under pressurized conditions, O-ring 4 is urged in the direction of O-ring groove side wall 9 to provide a seal between the end plug and the pressure vessel. In addition, it is preferred that the dimension of O-ring side wall 7 is from about 100% to about 175% of the diameter of O-ring 4 in its transverse cross-section and that the dimension of O-ring side wall 9 is from about 50% to about 100% of the diameter of O-ring 4. The distance between side wall 7 and side wall 9 is preferably from about 125% to about 1000% of the diameter of O-ring 4 and more preferably from about 125% to about 800% of the diameter of O-ring 4.

Figure 3:
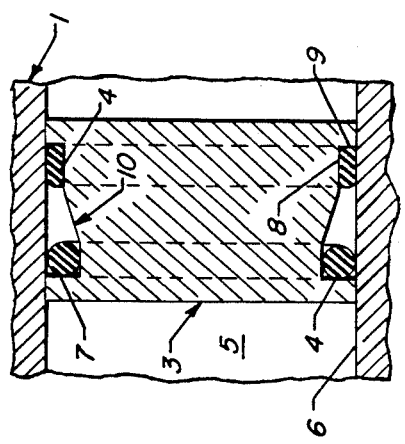
FIG. 3 of the drawing represents a cross-sectional view of another preferred end plug.

In FIG. 3 an enlarged cross-sectional view of another preferred end plug 3 is shown and which is provided with annular ramped O-ring groove 10 for receiviing and retaining O-ring 4. O-ring groove 10 includes vertical O-ring groove side wall 7 and 9, and stepped O-ring groove bottom 8. O-ring groove side wall 7 is the first portion of O-ring groove 10 to be inserted and installed in the opening of a pressure vessel and possesses a dimension or depth which is greater than the dimension or depth of O-ring groove side wall 9. In this embodiment, it is also preferred that the dimension of O-ring groove side wall 7 is equal to or greater than the diameter of O-ring 4 in its transverse cross-section which provides a position or location for O-ring to reside during installation, particularly in combination with stepped O-ring groove bottom 8. It is also preferred in this mbodiment that the dimension of O-ring in its transverse cross-section so that a seal is provided under pressurized conditions. In addition, it is preferred that the dimension of O-ring side wall 7 is from about 100% to about 175% of th diameter of O-ring 4 in its transverse cross-section and that the dimension of O-ring side wall 9 is from about 50% to about 100% of the diameter of O-ring 4. The distance between side wall 7 and side wall 9 is preferably from about 125% to about 1000% of the diameter of O-ring 4 and more preferably from about 125% to about 800% of the diameter of O-ring 4. It is preferred that the two stepped portions of O-ring groove bottom 8 are perpendicular to O-ring groove side walls 7 and 9 or, in other words, are parallel to the longitudinal axis of end plug 3. The sloped portion of O-ring groove bottom 8 connecting the two stepped portions is preferably a single surface which joins the two stepped portions. In accordance with the present invention, the term "ramped" bottom is meant to describe a sloping or stepped bottom as shown in the drawing and described herein.

Figure 4:
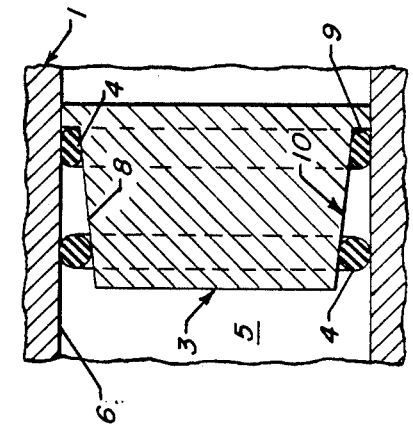
FIG. 4 of the drawing represents a cross-sectional view of yet another preferred end plug.

In FIG. 4 an enlarged cross-sectional view of yet another preferred end plug 3 is shown and which is provided with annular O-ring groove 10 for receiving and retaining O-ring 4. O-ring groove 10 includes vertical O-ring groove side wall 9 and sloped O-ring groove bottom 8. In this embodiment, it is preferred that the dimension of O-ring groove side wall 9 is equal to or less than the diameter of O-ring 4 in its transverse cross-section and that the sum of the diameter of the small end of end plug 3 plus twice the diameter of O-ring 4 is equal to or less than the dimension of O-ring groove side wall 9 so that a seal is provided under pressurized conditions. In addition, it is preferred that the dimension of O-ring side wall 9 is from about 50% to about 100% of the diameter of O-ring 4 in its transverse cross-section.

In accordance with the present invention, the O-rings employed are preferably resilient and resistant to attack by the contents of the pressure vessel and ambient or process conditions and may conveniently be manufactured from Teflon, plastic, rubber, synthetic rubber or any other suitable material, for example. O-rings are preferably configured in a continuous circle or elipse and are generally or circular cross-section. The O-rings contemplated for use in the present invention are conventional and well known to those skilled in the art.

The present invention may be employed in conjunction with any situation which requires an O-ring closure assembly for a pressure vessel. Pressure vessels are used, for example, in large-scale commercial production, in small-scale experimental work and in analytical laboratory testing.

A preferred embodiment of the present invention is utilized in a pressure vessel which is employed in a process for conducting reverse osmosis for purifying raw water. The purification of water by reverse osmosis is a well-known process and a more detailed description of reverse osmosis is provided in U.S. Pat. Nos. 4,594,161 (Goto) and 4,600,512 (Aid).

The present invention is further demonstrated by the following illustrative embodiment. This illustrative embodiment is, however, not presented to unduly limit this invention, but to further illustrate the arrangement and design details of the hereinabove described preferred embodiment. The following description is considered prospective and reasonably illustrative of the expected design of the invention.

ILLUSTRATIVE EMBODIMENT

In a commercially designed apparatus employed in a process for conducting reverse osmosis for purifying raw water a bank of horizontally disposed cylindrical pressure vessels containing reverse osmosis elements are assembled and connected with appropriate manifold piping. In a typical representative installation, each pressure vessel is approximately 3 meters in length and has an outside diameter of about 28 centimeters. Each end of the pressure vessel is closed with a cylindrical end plug having an outside diameter of about 20 centimeters. Th end plugs have a groove for receiving and retaining an O-ring in accordance with the present invention. An O-ring with a cross-sectional diameter of 3 millimeters is employed in a groove having a width of 9 millimeters, an inboard vertical side wall of about 3 millimeters, an outboard vertical side wall of about 2.5 millimeters and a sloped bottom. Each end plug is held in position with a segmented ring which is seated in a continuous circular groove which is located on the internal cylindrical surface of the pressure vessel.

The foregoing description, illustrative embodiment and drawing clearly illustrate the advantages encompassed by the present invention and the benefits to be afforded with the use thereof.

We claim as our invention:

1. A closure assembly for pressurized vessels comprising:
   (a) a hollow pressure vessel having an internal cylindrical surface;
   (b) an end plug slidably mounted in said pressure vessel and contacting said internal cylindrical surface;
   (c) said internal cylindrical surface having a continuous circular groove to receive a segmented ring which retains said end plug in said pressure vessel; and
   (d) said end plug having a continuous circular groove to receive an O-ring seal, said continuous circular groove having a ramped bottom and two substantially vertical side walls whereby said circular groove possesses a region to receive said O-ring seal in an essentially uncompressed state and another region to receive said O-ring seal in a compressed state.

2. The closure assembly of claim 1 wherein said hollow pressure vessel is substantially cylindrical.

3. The closure assembly of claim 1 wherein said continuous circular groove contains an O-ring seal.

4. The closure assembly of claim 3 wherein said O-ring seal comprises plastic, rubber, or synthetic rubber.

5. The closure assembly of claim 2 wherein a first substantially vertical side wall possesses a dimension approximately equal to the diameter of the transverse crosssection of said O-ring seal and a second substantially vertical side wall possesses a dimension less than the diameter of the transverse cross-section of said O-ring seal.

6. The closure assembly of claim 3 wherein a first substantially vertical side wall possesses a dimension from about 100% to about 175% of the transverse crosssection of said O-ring seal and a second substantially vertical side wall possesses a dimension from about 50% to about 100% of the transverse cross-section of said O-ring seal.

7. An apparatus for receiving and retaining an O-ring seal located in the surface of a member to be in sliding sealing engagement with an opposed member wherein said apparatus comprises a groove having a ramped bottom and two substantially vertical side walls with said groove extending around said surface of said member and possessing a region to receive said O-ring seal in an essentially uncompressed state and another region to receive said O-ring in a compressed state.

8. The apparatus of claim 7 wherein said groove contains an O-ring seal.

9. The apparatus of claim 8 wherein said O-ring seal comprises plastic, rubber or synthetic rubber.

10. The apparatus of claim 8 wherein a first substantially vertical side wall possesses a dimension approximately equal to the diameter of the transverse crosssection of said O-ring seal and a second substantially vertical side wall possesses a dimension less than the diameter of the transverse cross-section of said O-ring seal.

11. The apparatus of claim 8 wherein a first substantially vertical side wall possesses a dimension from about 100% to about 175% of the transverse cross-section of said O-ring and a second substantially vertical side wall possesses a dimension from about 50% to about 100% of the transverse cross-section of said O-ring seal.

12. An end plug having a continuous circular groove having a ramped bottom and two substantially vertical side walls for receiving and retaining an O-ring seal whereby said circular groove possesses a region to receive said O-ring seal in an essentially uncompressed state and another region to receive said O-ring seal in a compressed state.

13. The end plug of claim 12 wherein said continuous circular groove contains an O-ring seal.

14. The end plug of claim 13 wherein said O-ring seal comprises plastics, rubber or synthetic rubber.

15. The end plug of claim 13 wherein a first substantially vertical side wall possesses a dimension approximately equal to the diameter of the transverse crossection of said O-ring seal and a second substantially vertical side wall possesses a dimension less than the diameter of the transverse cross-section of said O-ring seal.

16. The end plug of claim 13 wherein a first substantially vertical side wall possesses a dimension from about 100% to about 175% of the transverse crosssection of said O-ring and a second substantially vertical side wall possesses a dimension from about 50% to about 100% of the transverse cross-section of said O-ring seal.

17. An end plug having a continuous circular taper adjacent to an annular projection for receiving and retaining an O-ring seal whereby said continuous circular taper possesses a region to receive said O-ring in an essentially uncompressed state and another region to receive said O-ring seal in a compressed state.

18. The end plug of claim 17 wherein said continuous circular taper supports an O-ring seal.

19. The end plug of claim 18 wherein said O-ring seal comprises plastic, rubber or synthetic rubber.

20. The end plug of claim 18 wherein said annular projection possesses a dimension perpendicular to the longitudinal axis of said end plug of less than the diameter of the transverse cross-section of said O-ring seal.

21. The end plug of claim 18 wherein said annular projection possesses a dimension perpendicular to the longitudinal axis of said end plug from about 50% to about 100% of the transverse cross-section of said O-ring seal.

22. A process for conducting reverse osmosis in a pressure vessel having a closure assembly which comprises:
(a) a hollow pressure vessel having an internal cylindrical surface;
(b) an end plug slidably mounted in said pressure vessel and contacting said internal cylindrical surface;
(c) said internal cylindrical surface having a continuous circular groove to receive a segmented ring which retains said end plug in said pressure vessel; and
(d) said end plug having a continuous circular groove to receive an O-ring seal, said continuous circular groove having a ramped bottom and two substantially vertical side walls, and possessing a region to receive said O-ring seal in an essentially uncompressed state and another region to receive said O-ring in a compressed state.

23. The process of claim 18 wherein said second continuous circular groove contains an O-ring seal.

24. The process of claim 23 wherein said O-ring seal comprises plastic, rubber or synthetic rubber.

25. The process of claim 23 wherein a first substantially vertical side wall possesses a dimension approximately equal to the diameter of the transverse cross-section of said O-ring seal and a second substantially vertical side wall possesses a dimension less than the diameter of the transverse cross-section of said O-ring seal.

26. The process of claim 23 wherein a first substantially vertical side wall possesses a dimension from about 100% to about 175% of the transverse cross-section of said O-ring seal and a substantially vertical side wall possesses a dimension from about 50% to about 100% of the transverse cross-section of said O-ring seal.

* * * * *

UNITED STATES PATENT AND TRADEMARK OFFICE
CERTIFICATE OF CORRECTION

PATENT NO. : 4,739,899
DATED : April 26, 1988
INVENTOR(S) : Thompson et al.

It is certified that error appears in the above-identified patent and that said Letters Patent is hereby corrected as shown below:

In Column 6, line 44: Change "2" to --3--;

In Column 7, line 12: After "O-ring", insert --seal--;

line 26: Change "plastics" to --plastic--;

line 36: After "O-ring", insert --seal--;

In Column 8, line 31: After "said", delete --second--;

line 44: Before "substantially", insert --second--.

Signed and Sealed this

First Day of November, 1988

Attest:

DONALD J. QUIGG

*Attesting Officer*  *Commissioner of Patents and Trademarks*